United States Patent
Min et al.

(10) Patent No.: US 9,092,677 B2
(45) Date of Patent: Jul. 28, 2015

(54) APPARATUS AND METHOD FOR RECOGNIZING LOCATION OF VEHICLE

(75) Inventors: Kyoung-Wook Min, Daejeon (KR); Jeong-Dan Choi, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 424 days.

(21) Appl. No.: 13/601,625

(22) Filed: Aug. 31, 2012

(65) Prior Publication Data

US 2013/0155222 A1    Jun. 20, 2013

(30) Foreign Application Priority Data

Dec. 14, 2011  (KR) .......................... 10-2011-0134842

(51) Int. Cl.
  *H04N 7/18*    (2006.01)
  *G06K 9/00*    (2006.01)

(52) U.S. Cl.
  CPC .................................. *G06K 9/00818* (2013.01)

(58) Field of Classification Search
  CPC ........... B60R 2300/00; B60R 2300/30; B60R 2300/301; G05D 1/021; G05D 1/0212; G05D 1/0214; G05D 1/0231; G05D 1/0234; G05D 1/0255; G05D 1/0257; G08G 1/16; G08G 1/0968; G08G 1/096805; G06K 9/00818
  USPC ............... 348/118; 701/23, 28, 301; 340/937, 340/995.1, 995.24, 988, 435
  See application file for complete search history.

(56) References Cited

U.S. PATENT DOCUMENTS

| | | | |
|---|---|---|---|
| 5,170,352 A * | 12/1992 | McTamaney et al. | 701/26 |
| 5,559,695 A * | 9/1996 | Daily | 701/1 |
| 5,923,791 A * | 7/1999 | Hanna et al. | 382/295 |
| 6,173,222 B1 * | 1/2001 | Seo et al. | 701/41 |
| 6,247,002 B1 * | 6/2001 | Steels | 706/20 |
| 6,438,491 B1 * | 8/2002 | Farmer | 701/301 |
| 6,859,705 B2 * | 2/2005 | Rao et al. | 701/45 |
| 7,333,631 B2 * | 2/2008 | Roh et al. | 382/104 |
| 8,164,627 B1 * | 4/2012 | Hahn | 348/148 |
| 8,527,141 B2 * | 9/2013 | Takahashi | 701/30.3 |
| 2005/0209776 A1 * | 9/2005 | Ogino | 701/211 |
| 2006/0165376 A1 * | 7/2006 | Park | 386/83 |
| 2008/0040004 A1 * | 2/2008 | Breed | 701/45 |
| 2010/0063680 A1 * | 3/2010 | Tolstedt et al. | 701/41 |
| 2010/0250116 A1 * | 9/2010 | Yamaguchi et al. | 701/201 |
| 2010/0253918 A1 * | 10/2010 | Seder et al. | 353/13 |
| 2010/0280699 A1 * | 11/2010 | Bageshwar et al. | 701/26 |
| 2011/0150348 A1 * | 6/2011 | Anderson | 382/224 |
| 2011/0153136 A1 * | 6/2011 | Anderson | 701/25 |
| 2012/0136510 A1 | 5/2012 | Min et al. | |
| 2013/0101230 A1 * | 4/2013 | Holeva et al. | 382/202 |

FOREIGN PATENT DOCUMENTS

KR    10-2012-0059109 A    6/2012

* cited by examiner

*Primary Examiner* — Victor Kostak
(74) *Attorney, Agent, or Firm* — Rabin & Berdo, P.C.

(57) ABSTRACT

Disclosed herein are an apparatus and method for recognizing the location of a vehicle. The apparatus includes a landmark recognition unit, a distance recognition unit, and a vehicle location calculation unit. The landmark recognition unit receives information about images of landmarks, indicated around a road in a direction in which the vehicle is traveling, from an image sensor, and recognizes a reference landmark closest to the vehicle based on the image information. The distance recognition unit collects values of distances to the reference landmark from the range sensor. The vehicle location calculation unit calculates the final location of the vehicle based on basic information about the reference landmark and the distance values.

14 Claims, 8 Drawing Sheets

| RANGE ANGLE | 45° | 45.5° | ... | 65° |
|---|---|---|---|---|
| DISTANCE VALUE | 503cm | 502cm | ... | 494cm |

APPARATUS AND METHOD FOR RECOGNIZING LOCATION OF VEHICLE

CROSS-REFERENCE TO RELATED APPLICATION

This application claims the benefit of Korean Patent Application No. 10-2011-0134842, filed on Dec. 14, 2011, which is hereby incorporated by reference in its entirety into this application.

BACKGROUND OF THE INVENTION

1. Technical Field

The present invention relates generally to an apparatus and method for recognizing the location of a vehicle and, more particularly, to an apparatus and method for recognizing the location of a vehicle, which are capable of recognizing landmarks, previously indicated around a road, using the image camera and range sensor of the vehicle, and guiding the vehicle in an unmanned manner based on the recognized landmarks.

2. Description of the Related Art

In general, a vehicle controller for unmanned autonomous driving must know the path to a destination and perform control so that the path can be followed. In order to follow the path, the throttling and steering of the vehicle can be controlled when the current location of the vehicle and the angle of the vehicle for steering control, that is, the heading, are precisely known. In addition, brakes and a gear transmission must be controlled in order to temporarily stop and then restart the vehicle so as to deal with the appearance of an obstacle.

As described above, unmanned autonomous driving is performed by generating control commands capable of controlling a plurality of electronic devices included in a vehicle, using information about the current location and heading of the vehicle and obstacles as input.

However, the information about the current location and heading of the vehicle required for unmanned autonomous driving can be obtained using a Global Positioning System (GPS)/Real Time Kinematic (RTK), which are expensive equipment. Accordingly, a problem arises in that it is difficult to commercialize the unmanned autonomous driving service because information about the current location and heading of a vehicle must be obtained by using the expensive equipment as described above.

As a result, there is a need for a technology for providing an unmanned autonomous driving service without requiring expensive equipment.

SUMMARY OF THE INVENTION

Accordingly, the present invention has been made keeping in mind the above problems occurring in the prior art, and an object of the present invention is to provide an apparatus and method for recognizing the location of a vehicle, which are capable of recognizing landmarks, previously indicated around a road, using the image camera and range sensor of the vehicle, and guiding the vehicle in an unmanned manner based on the recognized landmarks.

In order to accomplish the above object, the present invention provides an apparatus for recognizing the location of a vehicle, including a landmark recognition unit for receiving information about images of landmarks, indicated around a road in a direction in which the vehicle is traveling, from an image sensor, and recognizing a reference landmark closest to the vehicle based on the image information; a distance recognition unit for collecting values of distances to the reference landmark from the range sensor; and a vehicle location calculation unit for calculating a final location of the vehicle based on basic information about the reference landmark and the distance values.

The landmark recognition unit may search a landmark information table for information about the location of the reference landmark, and calculate range angles with respect to the reference landmark based on the location of the image sensor.

The basic information about the reference landmark may include the location information and range angles of the reference landmark.

The distance recognition unit may control the range sensor using the location information and range angles of the reference landmark as parameters.

The vehicle location calculation unit may calculate a representative distance value based on the distance values, and calculate a location value of the range sensor based on the location information and range angles of the reference landmark and the representative distance value.

The vehicle location calculation unit may calculate the final location of the vehicle by using the location value of the range sensor and a distance to a center point of the vehicle.

The vehicle location calculation unit may calculate heading information, including a heading angle and heading direction of the vehicle, based on information about the final location of the vehicle and information about a previously calculated final location of the vehicle.

The landmark information table may include the global coordinates of points at which the landmarks are located.

In order to accomplish the above object, the present invention provides a method of recognizing the location of a vehicle, including receiving information about images of landmarks indicated around a road in a direction in which the vehicle travels, from an image sensor; recognizing a reference landmark closest to the vehicle based on the image information; collecting values of distances to the reference landmark from a range sensor; and calculating a final location of the vehicle based on basic information about the reference landmark and the distance values.

The recognizing the reference landmark may include selecting a landmark shown as being largest in the image information, as the reference landmark; searching a landmark information table for information about a location of the reference landmark; and calculating range angles with respect to the reference landmark based on the image sensor.

The collecting the distance values may include controlling the range sensor using the location information and range angles of the reference landmark as parameters; and collecting the values of the distances to the reference landmark which have been scanned by the range sensor.

The basic information about the reference landmark may include the location information and range angles of the reference landmark.

The calculating the final location of the vehicle may include calculating a representative distance value based on the distance values; calculating a location value of the range sensor based on the location information and range angles of the reference landmark and the representative distance value; and calculating the final location of the vehicle by using the location value of the range sensor and a distance to a center point of the vehicle.

The calculating the final location of the vehicle may further include calculating heading information, including a heading angle and heading direction of the vehicle, based on information about the final location of the vehicle and information about the previously calculated final location of the vehicle.

The landmark information table may include global coordinates of points at which the landmarks are located.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

The present invention will be described in detail with reference to the accompanying drawings below. Here, repetitive descriptions, and detailed descriptions of well-known functions or configurations which would unnecessarily obscure the gist of the present invention will be omitted. Embodiments of the present invention are provided to complete the explanation for those skilled in the art of the present invention. Therefore, the shapes and sizes of components in the drawings may be exaggerated to provide more precise descriptions.

Figure 1:
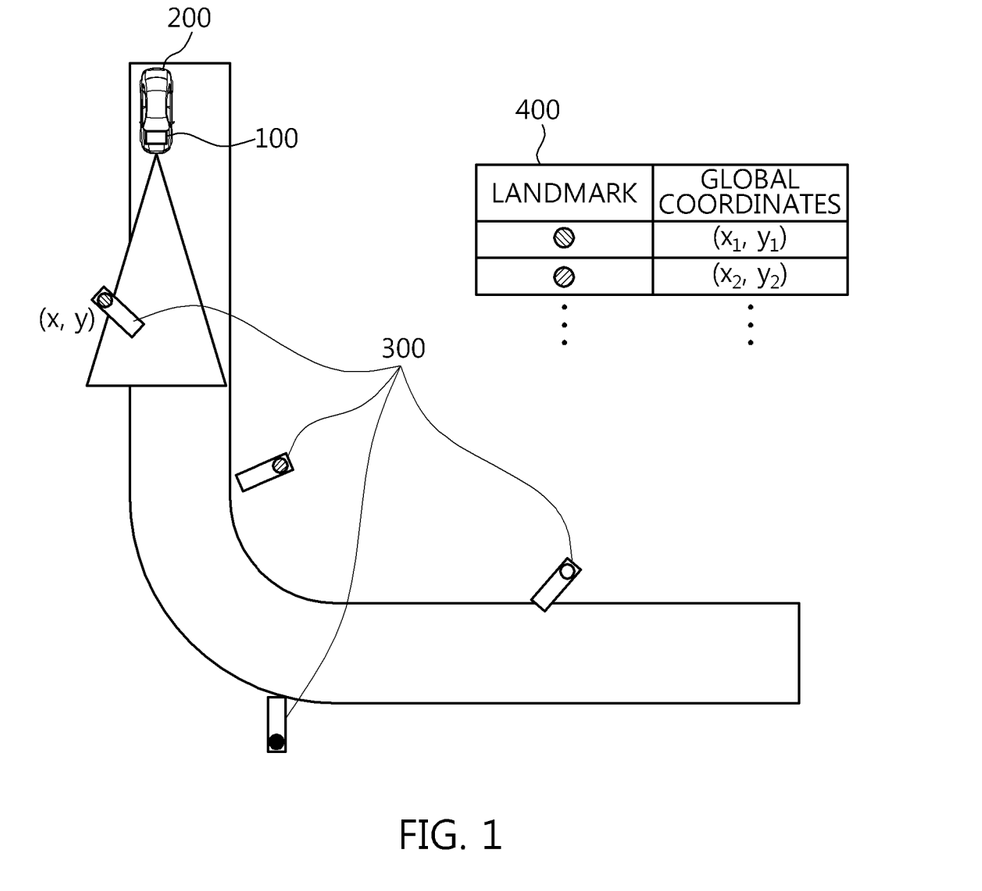
FIG. 1 is a diagram conceptually showing an unmanned autonomous driving service according to an embodiment of the present invention.
Figure 2:
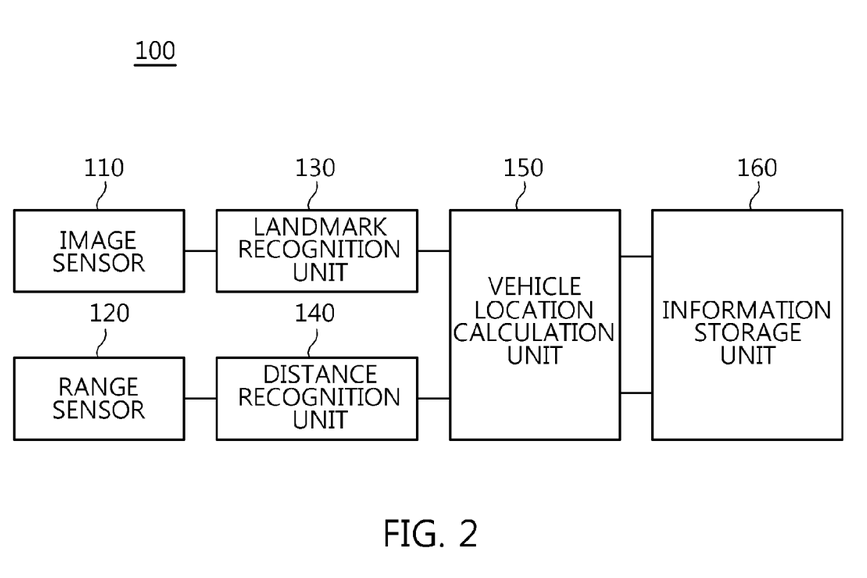
FIG. 2 is a diagram schematically showing an apparatus for recognizing the location of a vehicle according to an embodiment of the present invention.
Figure 3:
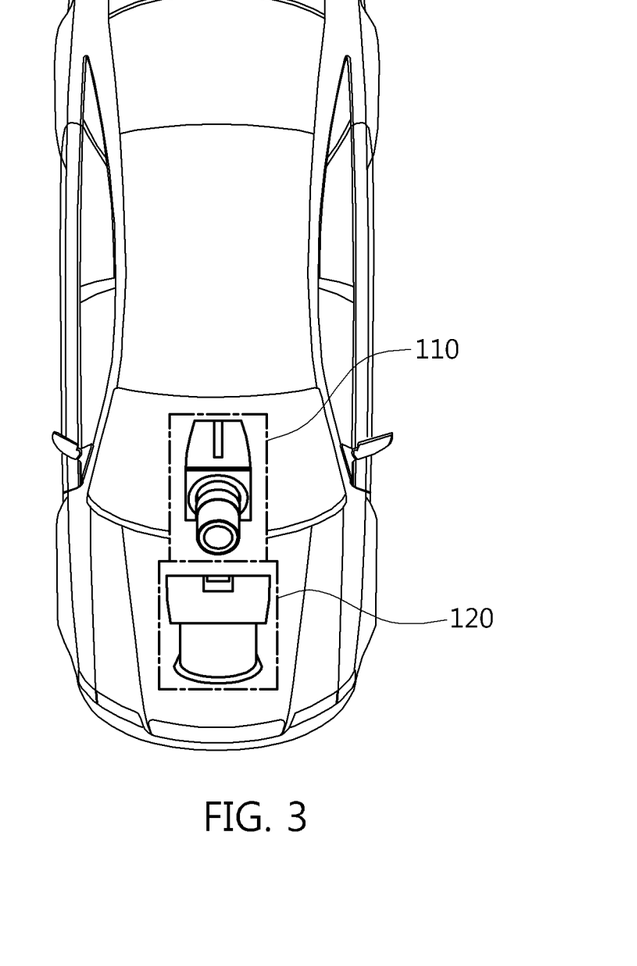
FIG. 3 is a diagram showing an example in which the image sensor and range sensor shown in FIG. 2 are disposed in a vehicle.
Figure 4:
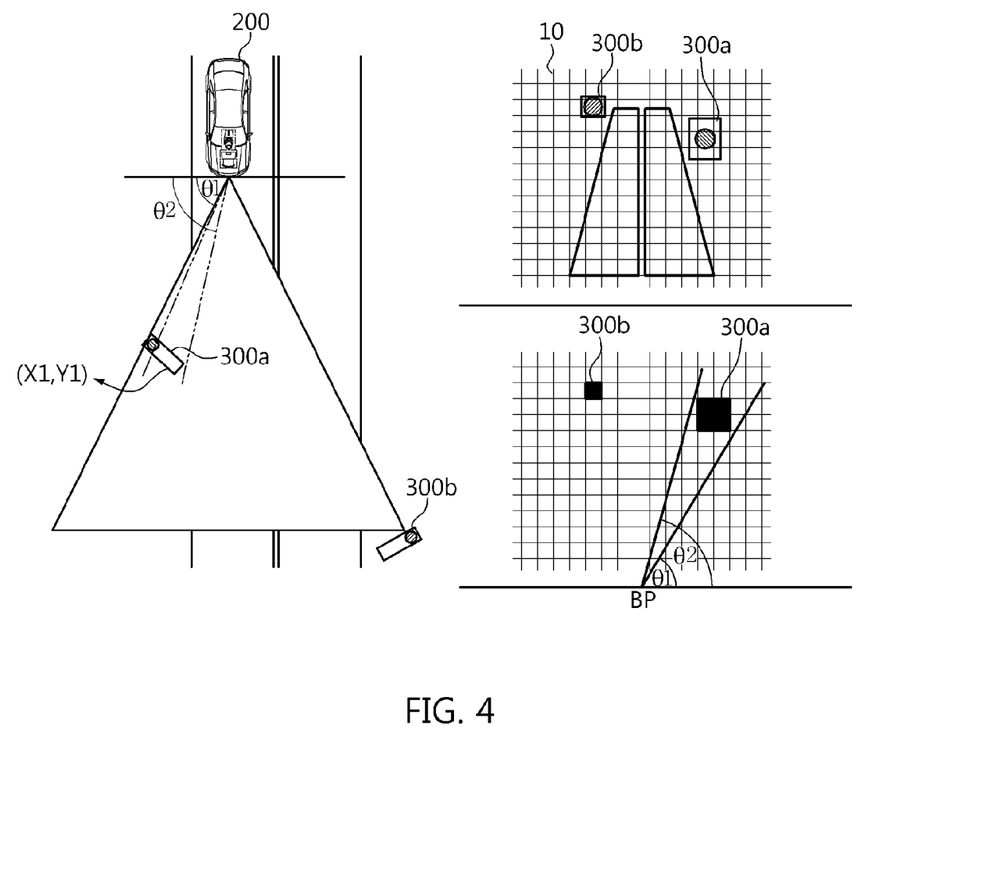
FIG. 4 is a diagram schematically showing an example in which landmarks are recognized according to an embodiment of the present invention.
Figure 5:
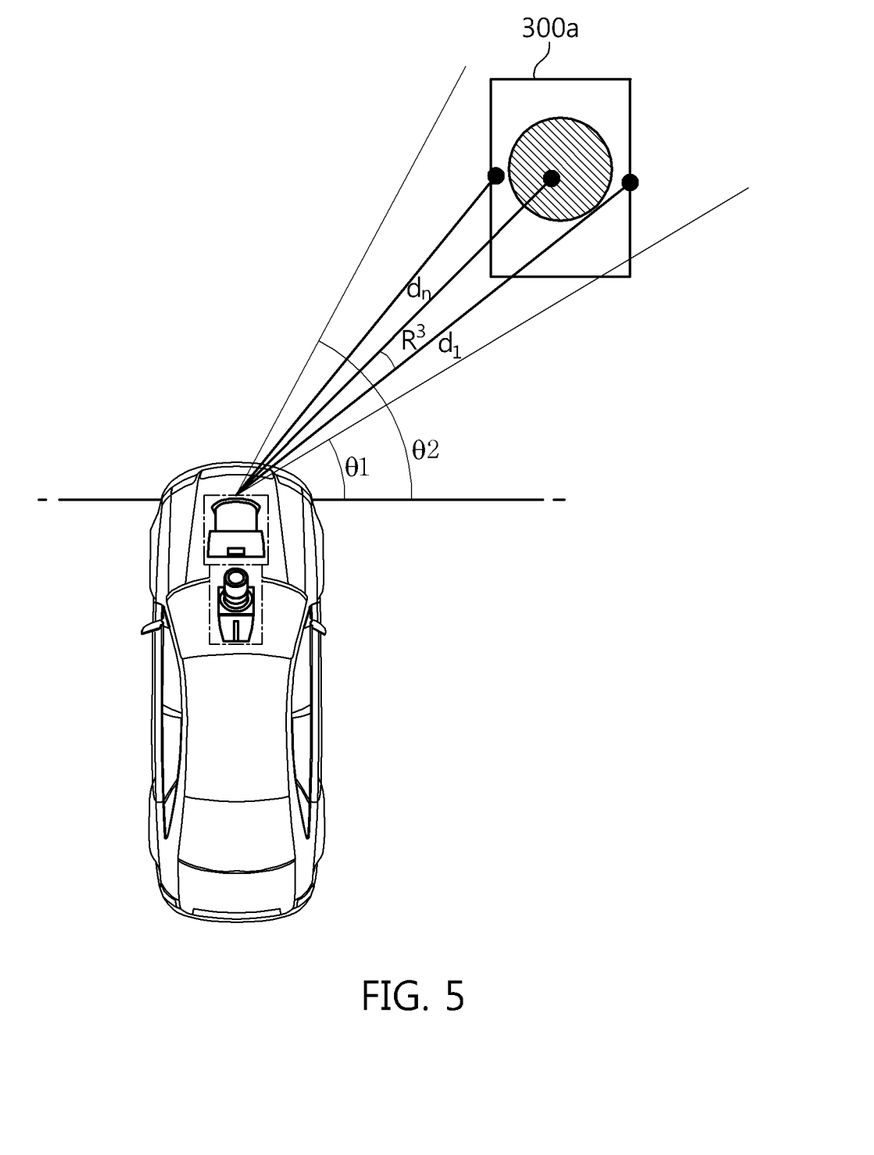
FIGS. 5 and 6 are diagrams showing examples in which the values of the distances to the landmarks are measured according to an embodiment of the present invention.
Figure 6:
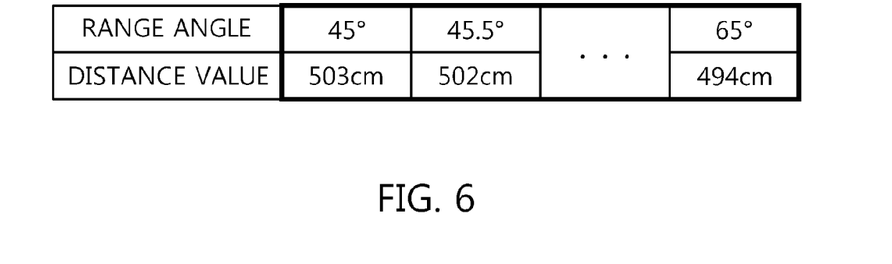
Figure 7:
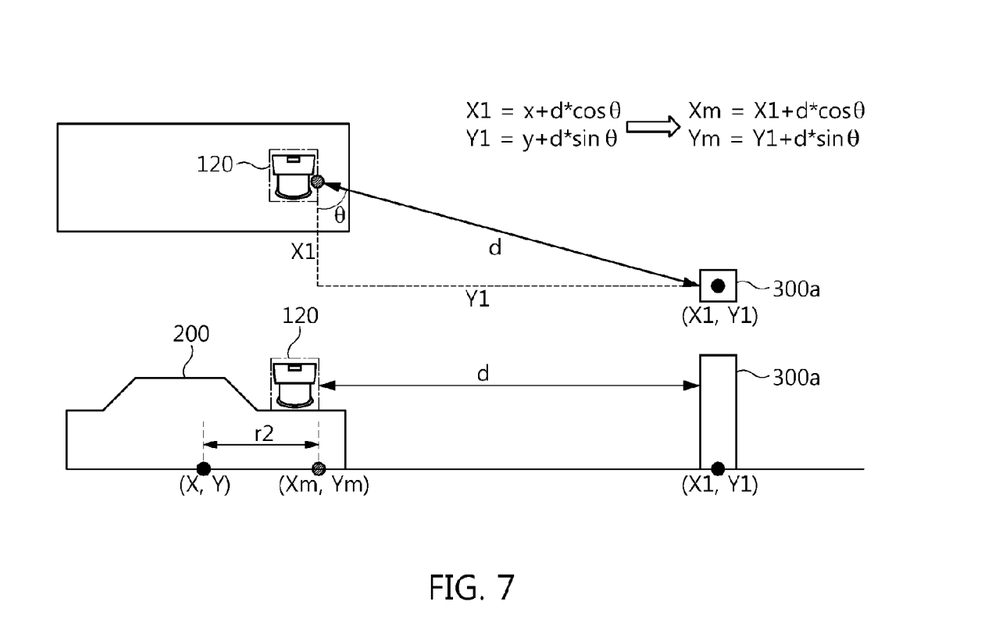
FIG. 7 is a diagram showing a conceptual diagram in which the location of a vehicle is calculated according to an embodiment of the present invention.
Figure 8:
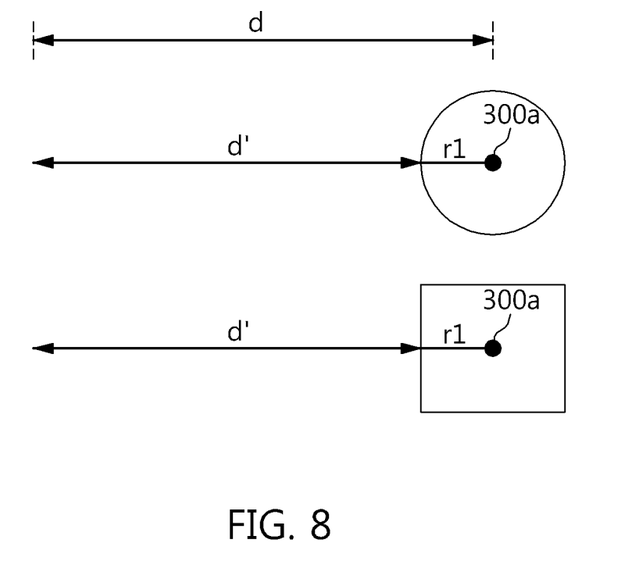
FIG. 8 is a diagram showing an example in which a representative distance value is calculated according to an embodiment of the present invention.
Figure 9:
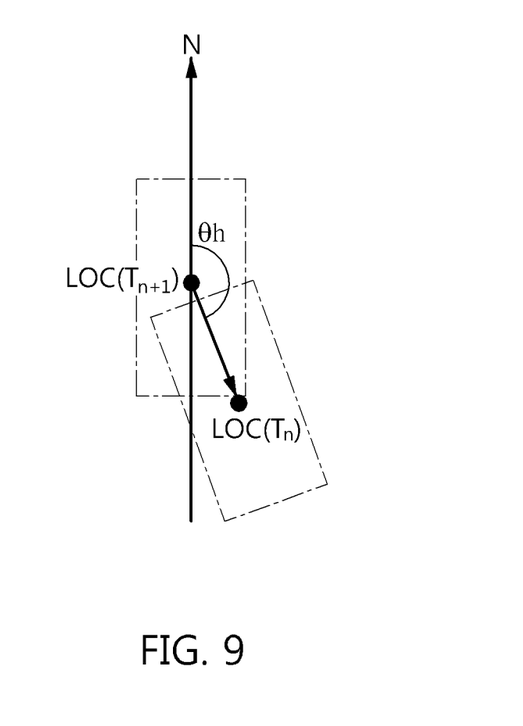
FIG. 9 is a conceptual diagram showing the calculation of heading information according to an embodiment of the present invention.

FIG. 1 is a diagram conceptually showing an unmanned autonomous driving service according to an embodiment of the present invention. FIG. 2 is a diagram schematically showing an apparatus for recognizing the location of a vehicle according to an embodiment of the present invention. FIG. 3 is a diagram showing an example in which the image sensor and range sensor shown in FIG. 2 are disposed in a vehicle. FIG. 4 is a diagram schematically showing an example in which landmarks according to an embodiment of the present invention are recognized. FIGS. 5 and 6 are diagrams showing examples in which the values of the distances to the landmarks are measured according to an embodiment of the present invention. FIG. 7 is a diagram showing a conceptual diagram in which the location of a vehicle is calculated according to an embodiment of the present invention. FIG. 8 is a diagram showing an example in which a representative distance value is calculated according to an embodiment of the present invention. FIG. 9 is a conceptual diagram showing the calculation of heading information according to an embodiment of the present invention.

As shown in FIG. 1, an apparatus for recognizing the location of a vehicle 100 according to the embodiment of the present invention is mounted on a vehicle 200, recognizes landmarks 300 previously indicated around a road, and provides an unmanned autonomous driving service based on the recognized landmarks. The unmanned autonomous driving service according to an embodiment of the present invention is applied to a road within a housing complex, a road within a specific area such as a parking lot, and a parking lot itself, rather than common roads.

Here, the landmarks 300 may be indicated by using existing streetlights or installing additional poles. The landmarks 300 are indicated by specific marks, such as color tones or writings/drawings, so that the landmarks can be recognized in the form of images. Basic information about the landmarks, including the precise global coordinates of points at which the landmarks are located, are previously measured and stored in the form of a landmark information table 400.

The apparatus for recognizing the location of a vehicle 100 includes an image sensor 110, a range sensor 120, a landmark recognition unit 130, a distance recognition unit 140, a vehicle location calculation unit 150, and an information storage unit 160, as shown in FIG. 2.

The image sensor 110 is basically included in line with the intelligence of a vehicle, and is disposed to be oriented in the direction in which the vehicle is traveling, as shown in FIG. 3. Furthermore, the image sensor 110 generates information (hereinafter referred to as landmark image information 10) about images of the previously indicated landmarks around roads in the direction where the vehicle travels. The image sensor 110 transfers the landmark image information 110 to the landmark recognition unit 130. The image sensor 110 may be a vision sensor capable of capturing images, such as an image camera, an infrared camera, and a visible ray camera.

The range sensor 120 is basically included in line with the intelligence of a vehicle, and is disposed to be oriented in a direction in which the vehicle is traveling, as shown in FIG. 3. The range sensor 120 may be a laser scanner sensor capable of measuring distance. Here, the laser scanner sensor varies depending on the type of product. For example, if a total scanning range is 180° and a scanning resolution angle is 0.5°, the range sensor 120 may sense a total of 361 distance values 0°, 0.5°, 1°, 1.5°, and . . . with a single scan.

The landmark recognition unit 130 receives the landmark image information 10 from the image sensor 110. Furthermore, the landmark recognition unit 130 recognizes the landmark closest to the vehicle based on the landmark image information 10. The landmark recognition unit 130 detects information about the location of the landmark recognized as being closest to the vehicle (global position) by searching basic landmark information stored in the information storage unit 160, and calculates range angles with the image sensor 110 set as a reference point. The landmark recognition unit 130 transfers the location information and the range angle to the distance recognition unit 140 and the vehicle location calculation unit 150.

More specifically, referring to FIGS. 2 and 4, the landmark recognition unit 130 receives the landmark image information 10 from the image sensor 110. The landmark recognition unit 130 recognizes a landmark 300*a* indicated in blue and a landmark 300*b* indicated in red, which are the ones closest to the vehicle 200, based on the landmark image information 10.

Here, since the landmark 300a is indicated as being larger than the landmark 300b in the landmark image information 10, the landmark recognition unit 130 recognizes that the landmark 300a is closer to the vehicle 200 than the landmark 300b. The landmark recognition unit 130 detects information X1 and Y1 about the location of the landmark 300a by searching the basic landmark information stored in the information storage unit 160. Furthermore, the landmark recognition unit 130 calculates the range angles θ1 and θ2 of the landmark 300a with the image sensor 110 set as a reference point BP. Here, the range angles of the landmark are used as parameters in a process to be described later, and they do not need to be precise range angles in which the recognized landmark is included. In other words, the range angles of a landmark, including the error which allows the landmark to be included therebetween, are good enough to be used.

Referring back to FIG. 2, the distance recognition unit 140 receives the information about the location of the landmark which was recognized as being closest to the vehicle and the range angles thereof from the landmark recognition unit 130. The distance recognition unit 140 controls the range sensor 120 so that it measures the distance based on the range angles of the landmark and the preset scanning resolution. Furthermore, the distance recognition unit 140 collects the values of the distances to the landmark which was scanned by the range sensor 120. The distance recognition unit 140 transfers the values of distances to the landmark to the vehicle location calculation unit 130 so that the location and heading of the vehicle 200 can be calculated.

More specifically, referring to FIGS. 2 and 5, the distance recognition unit 140 controls the range sensor 120 by setting the information X1 and Y1 about the location of the landmark 300a and the range angles θ1 and θ2 of the landmark 300a, received from the landmark recognition unit 130, as parameters. In other words, the distance recognition unit 140 controls the range sensor 120 so that it scans an area corresponding to the range angles θ1 and θ2 of the landmark 300a or an area included in the range angles θ1 and θ2 of the landmark 300a, and then collects distance values dl to do measured by the range sensor 120.

For example, referring to FIG. 6, if the range angles of the landmark 300a are "45° and 65°" and the scanning resolution R is "0.5," the distance recognition unit 140 may collect the distance value "5.03 m" when the range angle is "45°", the distance value "5.02 m" when the range angle is "45.5°" and the distance value "4.94 m" when the range angle is "65° " by controlling the range sensor 120 so that it scans an area having the range angle of "45° and 65°."

Referring back to FIG. 2, the vehicle location calculation unit 150 receives information about the location of a landmark which is recognized as being closest to a vehicle and the range angles thereof from the landmark recognition unit 130. Furthermore, the vehicle location calculation unit 150 receives the values of the distances to the landmark from the distance recognition unit 140. The vehicle location calculation unit 150 calculates the location of a vehicle 200 based on the information about the location, range angles and distance values of the landmark. The vehicle location calculation unit 150 calculates heading information based on history information about the locations of the vehicle 200. Here, the heading information includes a heading direction and a heading angle.

More specifically, referring to FIG. 7, the vehicle location calculation unit 150 calculates the representative distance value d of the distance values dl to do between the range sensor 120 and the landmark 300a, and calculates the location of the vehicle 200 based on the representative distance value d, and the location information X1 and Y1 and range angles θ1 and θ2 of the landmark 300a.

First, the representative distance value d may be calculated based on the mean value of all the distance values or the intermediate value of the range angles (e.g., a distance value corresponding to "55°" in FIG. 6). For example, if the landmark 300a is circle- or rectangle-shaped and the location of the landmark 300a is a center point, as shown in FIG. 8, the vehicle location calculation unit 150 may calculate the representative distance value d by adding a distance value d', calculated based on the mean value of all distance values or the intermediate value of range angles, to a distance r1 to the center point.

Furthermore, the vehicle location calculation unit 150 calculates the location values Xm and Ym of the range sensor 120 based on the information X1 and Y1 about the location of the landmark 300a and the representative distance value d. An equation which is used to calculate the location values Xm and Ym may be the following Equation 1:

$$Xm = X1 - d^{*}\cos\theta$$
$$Ym = Y1 - d^{*}\sin\theta \qquad (1)$$

The vehicle location calculation unit 150 calculates the final locations X and Y of the vehicle 200 by adding the location values Xm and Ym of the range sensor 120 and a distance r2 to the center point of the vehicle 200 which is already known. In an embodiment of the present invention, it is assumed that the distance r2 to the center point of the vehicle 200 is already known.

Furthermore, the vehicle location calculation unit 150 calculates heading information based on the final locations X and Y of the vehicle 200 and history information about the final locations of the vehicle 200 which have been previously calculated. For example, if the final location of the vehicle 200 is LOT(Tn) and the previously calculated final location of the vehicle 200 is LOT(Tn−1), as shown in FIG. 9, the vehicle location calculation unit 150 calculates a heading angle θh between the final location LOT(Tn) of the vehicle 200 and the previously calculated final location LOT(Tn−1) of the vehicle 200. Furthermore, the vehicle location calculation unit 150 calculates a heading direction based on the heading angle θh and the previously calculated final location LOT(Tn−1) of the vehicle 200.

Referring back to FIGS. 1 and 2, the information storage unit 160 stores all the information transmitted and received in order to provide the unmanned autonomous driving service. In particular, the information storage unit 160 stores a table which stores basic landmark information including the precise global coordinates of points at which landmarks previously indicated around a road are located. Furthermore, the information storage unit 160 stores history information about the final locations of the vehicle 200 and information about the heading of the vehicle 200.

Figure 10:
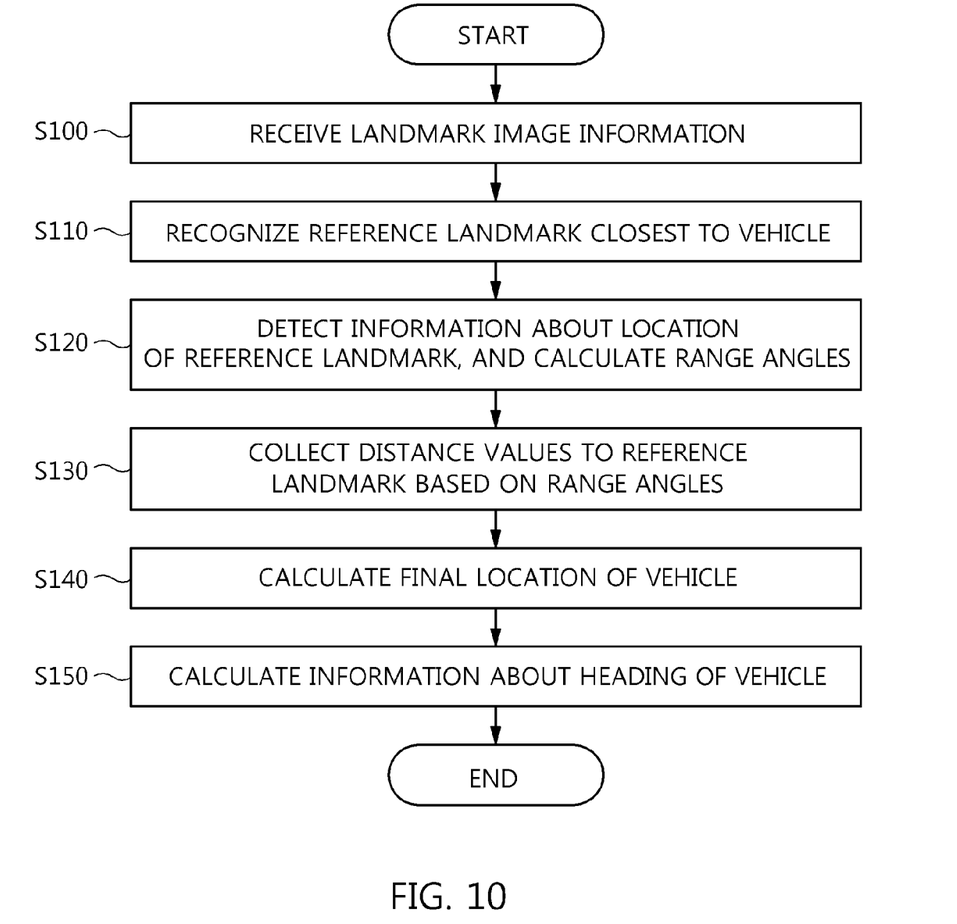
FIG. 10 is a flowchart illustrating a method of recognizing the location of a vehicle according to an embodiment of the present invention.

FIG. 10 is a flowchart illustrating a method of recognizing the location of a vehicle according to an embodiment of the present invention.

Referring to FIGS. 4, 7 and 10, the landmark recognition unit 130 of the apparatus for recognizing the location of a vehicle 100 according to the embodiment of the present invention receives the landmark image information 10 from the image sensor 110 at step S100. Furthermore, the landmark recognition unit 130 recognizes the landmark 300a closest to the vehicle 200 based on the landmark image information 10 at step S110.

The landmark recognition unit 130 searches the landmark information table for the information X1 and Y1 about the location of the landmark 300a. The landmark recognition unit 130 calculates the range angles θ1 and θ2 of the landmark 300a with the image sensor 110 set as a reference point at step S120. The landmark recognition unit 130 transfers the information X1 and Y1 and the range angles θ1 and θ2 to the distance recognition unit 140 and the vehicle location calculation unit 150.

The distance recognition unit 140 receives the location information X1 and Y1 and range angles θ1 and θ2 of the landmark 300a. The distance recognition unit 140 collects the distance values d1 to dn between the range sensor 120 and the landmark 300a by controlling the range sensor 120 using the range angles θ1 and θ2 as parameters at step S130. The distance recognition unit 140 transfers the distance values d1 to dn between the range sensor 120 and the landmark 300a to the vehicle location calculation unit 130.

The vehicle location calculation unit 130 receives the location information X1 and Y1 and range angles θ1 and θ2 of the landmark 300a and the distance values dl to dn from the landmark recognition unit 130 and the distance recognition unit 140. The vehicle location calculation unit 130 calculates the representative distance value d based on the distance values d1 to dn, and calculates the location values Xm and Ym of the range sensor 120 based on the representative distance value d and the information X1 and Y1 (see Equation 1). The vehicle location calculation unit 130 calculates the final locations X and Y of the vehicle 200 by adding the location values Xm and Ym of the range sensor 120 and the distance value r2 to the center point of the vehicle 200 which is already known at step S140.

Furthermore, the vehicle location calculation unit 130 calculates heading information, including the heading angle and heading direction of the vehicle 200, based on the final locations X and Y of the vehicle 200 and history information about the previously calculated final locations of the vehicle 200 at step S150.

As described above, in the embodiment of the present invention, the unmanned autonomous driving service can be provided even without requiring expensive equipment by recognizing landmarks previously indicated around a road using the image sensor and the range sensor normally mounted on the vehicle, calculating the location of the vehicle based on the recognized landmarks, and calculating heading information based on history information about the location of the vehicle.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for recognizing a location of a vehicle, comprising:
    a landmark recognition unit for receiving information about images of landmarks, indicated around a road in a direction in which the vehicle is traveling, from an image sensor, and recognizing a reference landmark closest to the vehicle based on the image information;
    a distance recognition unit for collecting values of distances to the reference landmark from a range sensor; and
    a vehicle location calculation unit for calculating a final location of the vehicle based on basic information about the reference landmark and the distance values;
    wherein the landmark recognition unit searches a landmark information table for information about a location of the reference landmark, and calculates range angles with respect to the reference landmark based on a location of the image sensor.

2. The apparatus of claim 1, wherein the basic information about the reference landmark comprises the location information and range angles of the reference landmark.

3. The apparatus of claim 2, wherein the distance recognition unit controls the range sensor using the location information and the range angles of the reference landmark as parameters.

4. The apparatus of claim 1, wherein the vehicle location calculation unit calculates a representative distance value based on the distance values, and calculates a location value of the range sensor based on the location information and range angles of the reference landmark and the representative distance value.

5. The apparatus of claim 4, wherein the vehicle location calculation unit calculates the final location of the vehicle by using the location value of the range sensor and a distance to a center point of the vehicle.

6. The apparatus of claim 5, wherein the vehicle location calculation unit calculates heading information, including a heading angle and heading direction of the vehicle, based on information about the final location of the vehicle and information about a previously calculated final location of the vehicle.

7. The apparatus of claim 1, wherein the landmark information table comprises global coordinates of points at which the landmarks are located.

8. A method of recognizing a location of a vehicle, comprising:
    receiving information about images of landmarks indicated around a road in a direction in which the vehicle travels, from an image sensor;
    recognizing a reference landmark closest to the vehicle based on the image information;
    collecting values of distances to the reference landmark from a range sensor; and calculating a final location of the vehicle based on basic information about the reference landmark and the distance values;
    wherein the recognizing the reference landmark comprises:
        searching a landmark information table for information about a location of the reference landmark; and
        calculating range angles with respect to the reference landmark based on the image sensor.

9. The method of claim 8, wherein the recognizing the reference landmark further comprises:
    selecting a landmark shown as being largest in the image information, as the reference landmark.

10. The method of claim 9, wherein the collecting the distance values comprises:
    controlling the range sensor using the location information and range angles of the reference landmark as parameters; and
    collecting the values of the distances to the reference landmark which have been scanned by the range sensor.

11. The method of claim 10, wherein the basic information about the reference landmark comprises the location information and the range angles of the reference landmark.

12. The method of claim 9, wherein the calculating the final location of the vehicle comprises:
    calculating a representative distance value based on the distance values;

calculating a location value of the range sensor based on the location information and range angles of the reference landmark and the representative distance value; and calculating the final location of the vehicle by using the location value of the range sensor and a distance to a center point of the vehicle.

13. The method of claim 12, wherein the calculating the final location of the vehicle further comprises calculating heading information, comprising a heading angle and heading direction of the vehicle, based on information about the final location of the vehicle and information about a previously calculated final location of the vehicle.

14. The method of claim 9, wherein the landmark information table comprises global coordinates of points at which the landmarks are located.

* * * * *